US008971345B1

(12) United States Patent
McCanne et al.

(10) Patent No.: US 8,971,345 B1
(45) Date of Patent: Mar. 3, 2015

(54) METHOD AND APPARATUS FOR SCHEDULING A HETEROGENEOUS COMMUNICATION FLOW

(75) Inventors: Steven McCanne, Berkeley, CA (US); Lap Nathan Trac, San Francisco, CA (US); Andrew Swan, Berkeley, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 570 days.

(21) Appl. No.: 12/729,127

(22) Filed: Mar. 22, 2010

(51) Int. Cl.
*H04L 12/54* (2013.01)
*H04L 12/851* (2013.01)
*H04L 12/18* (2006.01)

(52) U.S. Cl.
CPC ........ *H04L 47/2441* (2013.01); *H04L 12/1836* (2013.01)
USPC .......................................... 370/412

(58) Field of Classification Search
CPC ... H04L 69/165; H04L 29/06; H04L 12/1836; H04L 47/27; H04L 47/2441; H04L 12/5693; H04L 47/20; H04L 47/6215
USPC .................................. 370/412–418
See application file for complete search history.

(56) References Cited

U.S. PATENT DOCUMENTS

| | | | |
|---|---|---|---|
| 6,259,699 B1 * | 7/2001 | Opalka et al. | 370/398 |
| 6,738,352 B1 * | 5/2004 | Yamada et al. | 370/238 |
| 6,792,423 B1 | 9/2004 | Jeffries et al. | |
| 7,027,457 B1 * | 4/2006 | Chiussi et al. | 370/414 |
| 7,035,212 B1 * | 4/2006 | Mittal et al. | 370/230 |
| 2011/0158091 A1 * | 6/2011 | Sun et al. | 370/230 |

FOREIGN PATENT DOCUMENTS

| | | |
|---|---|---|
| EP | 1544757 A2 | 6/2005 |
| EP | 1544757 A3 | 11/2005 |
| WO | 03005288 A2 | 1/2003 |
| WO | 03005288 A3 | 1/2003 |

* cited by examiner

*Primary Examiner* — Ayaz Sheikh
*Assistant Examiner* — Mounir Moutaouakil
(74) *Attorney, Agent, or Firm* — Park, Vaughan, Fleming & Dowler LLP (57) ABSTRACT

A method and apparatus are provided for scheduling a heterogeneous communication flow. A heterogeneous flow is a flow comprising packets with varying classes or levels of service, which may correspond to different priorities, qualities of service or other service characteristics. When a packet is ready for scheduling, it is queued in order in a flow queue that corresponds to the communication flow. The flow queue then migrates among class queues that correspond to the class or level of service of the packet at the head of the flow queue. Thus, after the head packet is scheduled, the flow queue may be dequeued from its current class queue and requeued at the tail of another class queue. If the subsequent packet has the same classification, it may be requeued at the tail of the class queue or may remain in place for another servicing round.

13 Claims, 10 Drawing Sheets

METHOD AND APPARATUS FOR SCHEDULING A HETEROGENEOUS COMMUNICATION FLOW

FIELD

The present invention relates to scheduling network packets for data communications, and in particular to a system and method for scheduling the packets of one or more heterogeneous communication flows, wherein the packets of a single flow may be assigned to different classes of service and wherein the performance of the flow is sensitive to the reordering of packets in the flow.

BACKGROUND

When quality of service (QoS) of packet-based communications is a concern, network infrastructure may be configured to implement scheduling policies to provide differentiated and managed service levels to the different types of network traffic. One such approach is to lump the different types of network communications into aggregate units of traffic called "classes". This simplifies the packet scheduling problem because it allows all packets belonging to one class to be treated uniformly, even if they belong to different communication flows.

Link scheduling within a network device that implements this class-oriented approach to traffic management is often called "class-based queuing" or "class-based scheduling". Examples of class-based scheduling algorithms include CBQ (Class Based Queuing), HFSC (Hierarchical Fair Service Curve), HPFQ (Hierarchical Packet Fair Queuing), HTB (Hierarchical Token Buckets), and CB-WFQ (Class Based-Weighted Fair Queuing).

In a class-based queuing system, individual packets may be assigned to different classes or levels of service. Each such class has associated parameters (e.g., priority, bandwidth) that affect how packets assigned to that class are treated for scheduling, transmission and/or other purposes. Typically, a QoS policy defines how packets are mapped to classes of services, and may include one or more classification rules that operate on the data and control information present in a network packet in order to select an appropriate class. The class may be explicitly configured into the packets, as with DiffServ (Differentiated Services), or the class may be determined by configurable classification rules as part of a QoS system implemented within the device.

As packets arrive at a network device over one or more incoming communication links and are to be sent over a particular outgoing communication link incident to that device, the rate at which packets arrive may exceed the rate at which the link can service the packets. In this case, the device typically places the packets in a queuing module related to that link, and a scheduling algorithm determines, from the set of available packets in the system, which packet should be sent each time the link becomes available to transmit another packet.

In the case of class-based queuing, the queue for the overall link is represented as a set of class queues, one for each class specified by the QoS policy or policies. Each time a packet can be transmitted, the scheduler determines which class should go next, dequeues a packet from the corresponding class queue, and transmits the dequeued packet on the network link. Each class queue is in turn managed by a suitable queue management policy, e.g., FIFO (First-In, First-Out) drop-tail, RED (Random Early Discard), flow-based weighted fair queuing, and so forth.

QoS policies are created to establish class parameters like bandwidth and priority, and are typically configured into a class-based scheduler according to operator input through a network management system or user interface.

Typically, QoS policies and classification rules are devised such that all of the packets that comprise a communication flow are identified with the same class. The term flow is used to generically refer to all of the packets that comprise a particular network conversation between two process end points. In the TCP/IP (Transport Control Protocol/Internet Protocol) architecture, a flow is uniquely identified by a tuple consisting of the IP source address, the IP destination address, the IP protocol type, the transport protocol source port, and the transport protocol destination port.

For example, a flow might correspond to a Web connection between a computer desktop at an office and a Web application server in a company's data center using TCP. Or, a flow might correspond to a voice over IP (VoIP) connection between two telephones coupled via a corporate intranet, wherein the VoIP packets are conveyed via Real-time Transport Protocol (RTP) over User Datagram Protocol (UDP).

All the packets of the web connection would typically be classified into one class, and all of the packets of the VoIP call would be likewise classified into another class. A flow in which all packets are assigned to the same class of service may be termed a "homogeneous communication flow".

Homogenous communication flows interact well with class-based scheduling algorithms because schedulers that implement such algorithms generally operate to transmit packets from a class in the order they were received into that class. That is, class-based scheduling algorithms are generally order preserving in that the packets assigned to a given class are either: (1) serviced in FIFO order from within the class, or (2) serviced by a queue management algorithm where the ordering of packets comprising a flow is preserved even when the ordering of packets across flows might not be preserved (e.g., in weighted fair queuing). In either case, when a homogeneous communication flow traverses a class-based scheduler, all of the packets of the flow enter the same class due to the homogeneous nature of the flow, and thus are serviced on the output link in the same order they arrived at the input link.

However, it may be desirable to dynamically vary the class of service assigned to a given communication flow by assigning different classes to the various packets within the communication flow. This may be useful, for example, when different types of application messages are multiplexed onto a common communication flow. At one time the flow may carry interactive traffic, which requires a high class of service, while at another time the flow may carry a non-interactive print job, which can be adequately supported with a lower class of service. A flow for which the class of service varies across the packets comprising that flow may be termed a "heterogeneous communication flow".

Computing environments in which heterogeneous communication flows may be found include those that employ the ICA (Independent Computing Architecture) protocol by Citrix Systems, Inc. or the Remote Desktop Protocol (RDP) developed by Microsoft Corporation. The ICA protocol allows communication traffic from multiple virtual channels to be interleaved in one TCP connection, such as between a client device and a server computer.

For example, the ICA protocol may be used to allow a client application to run in a centralized corporate data center while the user accesses the client from a thin-client terminal over a wide-area network. The ICA protocol utilizes different virtual channels that are interleaved on top of a common TCP connection, where the different channels may correspond to computer screen updates on the client, video serving, printer mapping, mouse movements, etc.

Contention can arise when one user is performing a non-interactive but data-intensive task like printing, while another user is performing an interactive but lightweight task like moving a mouse across the screen. In this case, it is undesirable for the print traffic in one user's flow to adversely impact the mouse movements in another user's flow because of queuing in the network.

Resolving and managing such contention is precisely the role of QoS. However, if traditional class-based queuing were utilized, wherein a common class would be assigned to all the packets of all the ICA connections (e.g., by using a classification rule that matched TCP packets whose TCP ports indicated the ICA protocol), there would be no way to distinguish between the various priorities of the various virtual channels among the various ICA connections.

Instead, a QoS rule could be configured to implement a policy that differentiates among the packets that carry messages from the different virtual channels. To facilitate this, ICA includes a priority field associated with each virtual channel. Thus, a QoS policy could be implemented that inspects the priority field of the virtual channel header indicated in the ICA message carried in a TCP segment as it appears in the network as an IP packet. Parsing packet headers and inspecting the application-level data carried in network packets in this fashion for various purposes is sometimes called "deep packet inspection" (DPI).

DPI can be used to classify the packets of an ICA connection with various message types resulting in a range of classes being assigned to the different packets comprising the connection, thus resulting in a heterogeneous communication flow. Unfortunately, a problem arises when such a flow traverses a class-based scheduler.

In particular, the ICA packets will be managed as different classes by the scheduler in accordance with the DPI policy. That is, some packets of the heterogeneous flow will be queued as one class while other packets of the heterogeneous flow can simultaneously be queued as another class. To provide service differentiation, the class-based scheduler will schedule packets from the various classes in non-FIFO order. At times, this will invariably cause higher-priority class packets to be scheduled ahead of lower-priority class packets from the same heterogeneous flow even if the lower-priority packets arrived first.

Consequently, some packets of a heterogeneous communication flow that are subjected to QoS scheduling are likely to be received out of order at their destination. This can be problematic when the communication flow corresponds to a transport protocol that preserves the delivery ordering of data, including the ubiquitous TCP.

In the case of TCP, when packets are received out of order, they are buffered by the protocol until the missing data arrives. Only until a contiguous, sequenced portion of data arrives at the receiving host can TCP deliver that data to the application. If higher priority packets arrive before lower priority packets (e.g., because of a QoS policy applied in the network), TCP must then wait until the lower priority packets arrive and deliver those before the higher priority packets can be delivered, in order to preserve in-order delivery of data. Thus, in this scenario, the QoS policy failed to enhance the performance of the protocol or application.

Moreover, communication throughput can actually be made worse as the destination device reorders the flow's packets and/or requests retransmission of packets it believes were lost. The higher classification assigned to some packets in the flow may therefore end up having no benefit, or may even have a detrimental effect on the entire flow.

SUMMARY

In some embodiments of the invention, a method and apparatus are provided for scheduling a heterogeneous communication flow within a computing or communication device. A heterogeneous flow is a flow that comprises packets of varying classes or levels of service, which may correspond to different priorities, qualities of service or other service characteristics.

In these embodiments, when a packet is ready for scheduling, it is queued in order in a flow queue that corresponds to the communication flow. The flow queue itself is queued in a class queue that corresponds to the class of service of the packet at the head of the flow queue. Illustratively, the device's scheduling mechanism includes a class-based scheduler, wherein the scheduler services a set of class queues where each class queue is associated with a particular class of service.

After the packet at the head of a flow queue is serviced, the class of the subsequent packet in that flow queue is determined. The flow queue is then requeued at the tail of the class queue that corresponds to the determined class. Thus, the flow queue migrates between class queues according to the class of the packet currently at the head of the flow queue.

In some embodiments of the invention, two or more consecutive packets at a given class of service may be scheduled from one flow queue before it is dequeued from its current class queue and requeued according to the classification of the subsequent packet.

DETAILED DESCRIPTION OF ILLUSTRATIVE EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In embodiments of the invention described herein, a method and apparatus are provided for scheduling network packets using a modified class-based scheduling algorithm that maintains the ordering of packets within one or more heterogeneous communication flows. In some embodiments, this is accomplished by dynamically migrating all of the packets from a given flow between the class queues of a class-based scheduler based on the class of the packet at the head of the flow. In these embodiments, a heterogeneous flow is a communication flow (e.g., a TCP flow) in which the packets comprising the flow are classified to two or more distinct classes. The method of scheduling packets in this flow-aware fashion may be illustratively termed "flow-aware class-based queuing" (FA-CBQ), and a scheduler that performs FA-CBQ may be termed an "FA-CBQ scheduler."

Figure 1A:
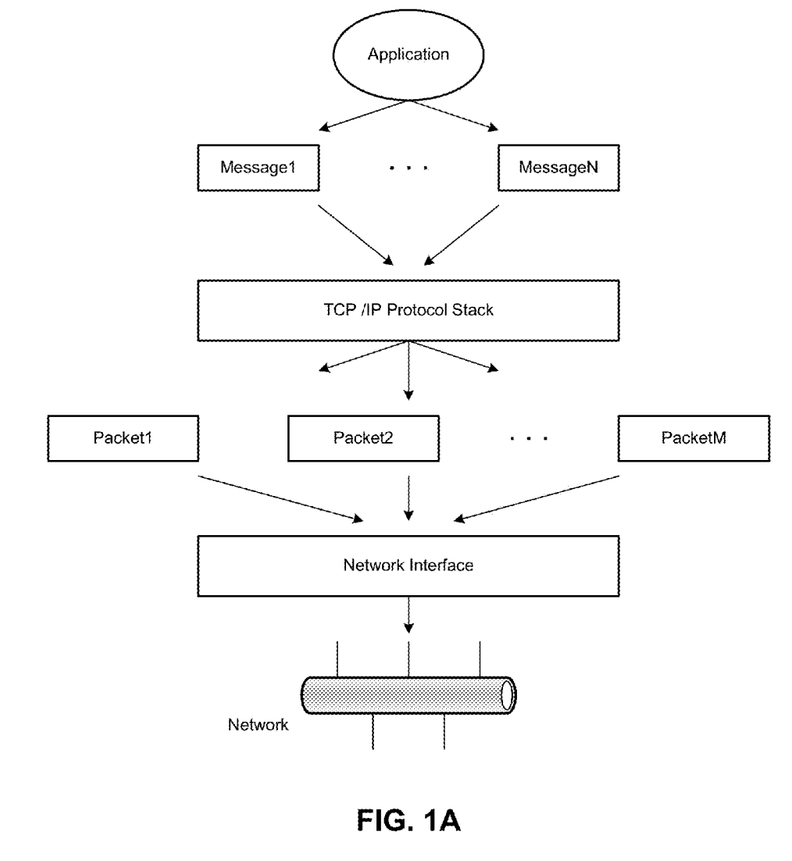
FIG. 1 is a block diagram depicting a computing environment in which two computing devices interact via a communication flow in which packets having different classifications are interleaved, according to some embodiments of the invention.

An illustrative heterogeneous flow could arise from a client or server process transmitting messages over a TCP connection using its reliable, byte-oriented interface, combined with a policy that dictates how the various messages carried in the TCP flow should be classified. FIG. 1A depicts the creation of an exemplary heterogeneous communication flow, wherein a source application issues messages having different classes of service to another application (or some other end point).

Because the application's interface with TCP is based upon a model of a continuous stream of bytes, the application typically does not control how the messages it issues are broken up into packets suitable for network transmission; this is a function of the protocol stack. For example, the application might present a large 100 KB buffer of various application messages to be transmitted over the network by TCP. TCP, in turn, breaks up the message into TCP segments that are further formatted into network packets by the IP layer of the protocol stack.

As can be seen in FIG. 1A, a problem arises in determining which packets correspond to which application messages, and therefore in determining what class of service should be applied to each packet in the heterogeneous flow. In practice, however, a network entity with a suitable amount of application knowledge can recognize various patterns of data in the payloads of TCP packets to determine the type of application messages carried in one or more packets, or the types of one or more application messages carried in a single packet (e.g., using methods of DPI or deep packet inspection). If necessary, such an entity can track state across the packets of a heterogeneous flow to aid in such a determination.

Figure 1B:
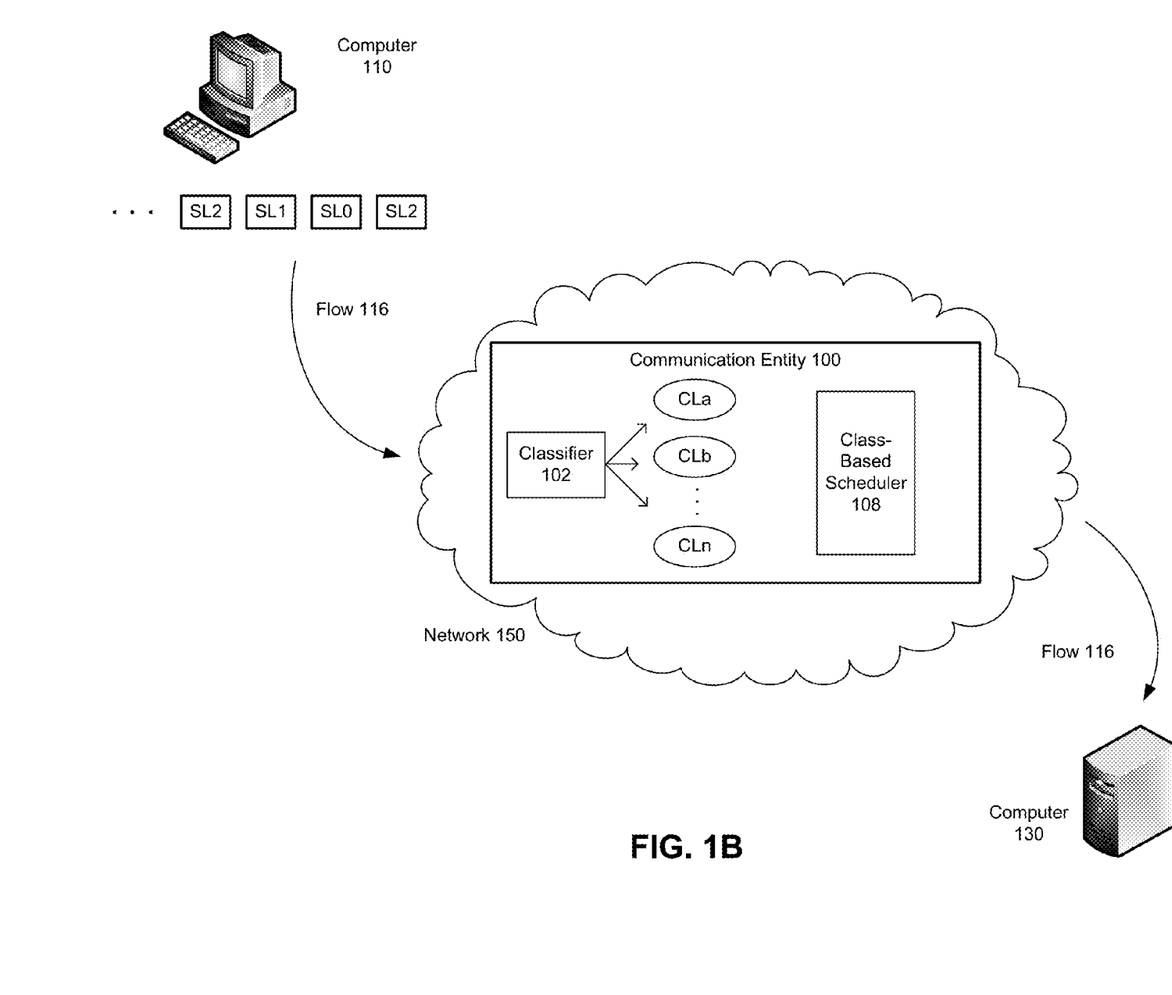

FIG. 1B is a diagram of a computing environment in which two end points communicate using one or more heterogeneous communication flows, wherein the packets of a flow may be scheduled according to their individual classifications, without being processed out of order, according to some embodiments of the invention.

In these embodiments, two computing devices (i.e., devices 110, 130) act as the end points for one or more heterogeneous network flows that transit network 150 (e.g., the Internet, an intranet). One such flow is depicted as flow 116.

Packets originated at computer 110 and conveyed via flow 116 correspond to different service levels, and are generated by an application process that writes messages to the TCP/IP interface (typically via the ubiquitous "socket" interface). The protocol stack breaks up the messages into TCP segments, which are in turn packetized by the IP layer into network packets, as described above in conjunction with FIG. 1A.

In different computing devices or embodiments of the invention, other such messages may be generated by, for example, a streams module, an applet, a daemon or some other sequence or collection of executable program instructions. In addition, in an alternative embodiment of the invention, a heterogeneous communication flow may be configured according to any protocol (not just TCP) that preserves the data delivery order between the application end points even if the underlying network reorders, delays or drops packets.

Within (or connected to) network 150, communication entity 100 performs packet classification based on policies that define how the various types of messages present in the packets of the flow in question should be classified. In some embodiments of the invention, communication entity 100 may comprise a network-based appliance, a router, a gateway, a network interface circuit or some other device configured to convey packet-based communications.

Within entity 100, an FA-CBQ scheduler such as scheduler 108 performs scheduling according to the present invention. Illustratively, classification module or classifier 102 of entity 100 associates each packet of flow 116 with a suitable class, wherein each class is associated with a different level of service. Multiple classes, designated CLa through CLn are depicted in FIG. 1B. In this manner, packets corresponding to different QoS classes are interleaved within flow 116.

In some computing environments, heterogeneous communication flows could arise from applications or protocols, other than TCP, that are not sensitive to packet reordering issues. For example, reliable multicast protocols have been devised to transport electronic whiteboard actions across a network, wherein certain protocol messages (like interactive drawing commands) have priority over other protocol messages (like a bulk transfer of image data).

Because they need not adhere to the requirements of TCP, such whiteboard applications can process protocol messages received in any order. In this case, a QoS policy could be deployed to schedule the interactive protocol messages with higher priority than non-interactive messages.

In this environment, it would not be desirable to preserve the order of the packets in the network, because the application end point is perfectly capable of processing out-of-order data and, unlike with TCP, application-based reordering has a positive impact on the application's performance with respect to the overall quality of service. In some embodiments of the present invention, a mixture of order-sensitive and order-insensitive heterogeneous communication flows can be properly handled.

In some methods and apparatuses presented herein, the packet ordering of a given flow is maintained during scheduling while still honoring the packets' differing classifications. In other methods and apparatuses presented herein, the packet ordering of order-sensitive flows is maintained during scheduling while still honoring the packets' differing classifications and, at the same time, the packet ordering of other non-order-sensitive flows is not necessarily maintained.

Figure 1C:
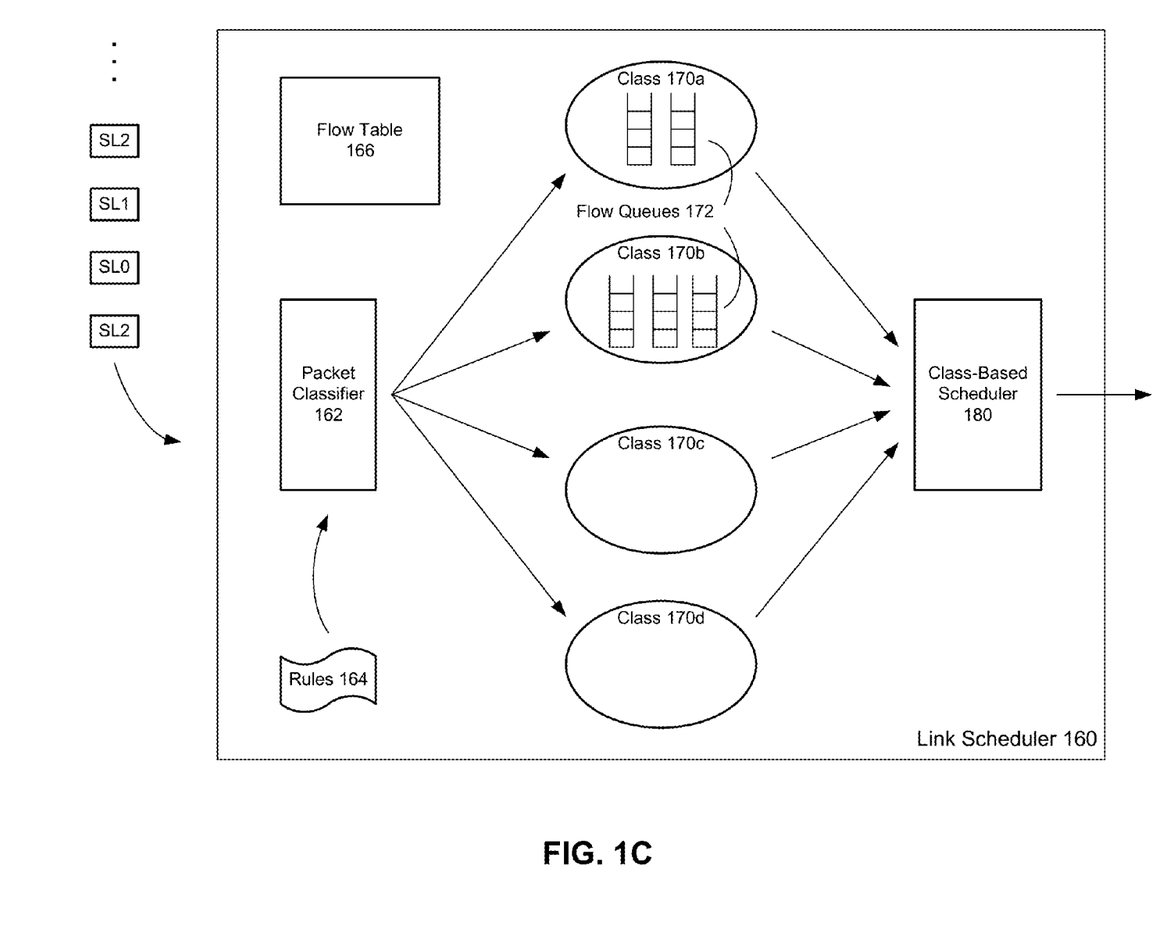

FIG. 1C is a block diagram of an FA-CBQ scheduling mechanism in which packets of a heterogeneous communication flow may be scheduled according to their individual classifications, without being processed out of order, according to some embodiments of the invention.

The illustrated mechanism may be implemented in many different network-resident computing devices, such as a router, a bridge, a switch, a router interface card, a QoS appliance, a firewall, a server load balancer, an application delivery controller, a wide-area network (WAN) accelerator, a network cache, a proxy and so on. In particular, embodiments of the invention may be employed to schedule one or more heterogeneous communication flows from, to, or through a Steelhead® appliance offered by Riverbed® Technology.

WAN accelerators are configured to optimize communications and applications (e.g., through compression, acceleration), and are referred to in the art by many different terms, including, but not limited to, WAN optimizers, WAN optimization controllers (WOCs), wide-area data services (WDS) appliances, WAN traffic optimizers (WTOs), and protocol accelerators or optimizers.

In traditional class-based QoS link schedulers, for each class of service supported within a given host device, a separate class queue is maintained for scheduling data communications within that class. The classes of service may be characterized by different priorities, bandwidths and/or any other QoS parameter that may be used to classify and distinguish packets.

As packets arrive, they are classified according to applicable rules and/or policies. Once a packet is classified, it is placed in the queue for that class. Each time the link is ready to service a packet, the scheduler chooses a class to service, selects and removes a packet from that class' queue, and transmits that packet on the link. Thus, each class is represented by a queue of packets awaiting service by the scheduler. Notably, with traditional scheduling, all packets in a given class queue belong to the same class.

However, in embodiments of the invention described herein, one or more separate class queues do not queue individual packets for scheduling, as with traditional scheduling schemes. As shown in FIG. 1C, a FA-CBQ scheduler queues flows instead of individual packets. Therefore, in the case of a heterogeneous flow, a class queue may store packets having different classifications.

To queue a flow, all of the packets of a given flow that are present at any point in time are stored in what is termed a "flow queue" (i.e., a queue for storing packets belonging to one flow). In this way, a FA-CBQ scheduler queues flows queues instead of packets. In some embodiments, a FA-CBQ scheduler may manage a mixture of flow queues and individual packets, wherein said packets belong to homogeneous flows or other flows that do not require the preservation of packet ordering.

In an embodiment of the invention depicted in FIG. 1C, packets arrive at link scheduler 160 via one network interface and may leave via another interface. Within scheduler 160, packet classifier 162 operates to classify packets into any of one or more classes, such as classes 170a through 170d. Embodiments of the invention described herein may support any number of classes. Separate flow queues 172 are maintained for some or all communication flows transiting the link scheduler.

Packet classifier 162 is configured according to one or more rules or policies 164, which specify how a packet is mapped to a class. As described earlier, the classifier may apply relatively simple filtering rules and/or more complex DPI techniques that involve tracking state across packets. As each packet arrives, rules 164 are applied and the packet is delivered to the corresponding class module.

In some embodiments of the invention, classes in which preservation of packet order is required may be marked with a suitable attribute. Quality of service rules may be configured to recognize the attribute and ensure that packets and flows are always classified to an order-preserving class. In this way, a single class-based scheduler can simultaneously manage classes that require packet ordering as well as classes that do not require such ordering.

Whether a class should be treated as order-preserving or not can be specified via the QoS policies administered by the operator via a network management system. For example, when defining a QoS class, the queue management could be specified as one of FIFO drop-tail, weighted fair queuing, RED, or flow-aware FIFO (FA-FIFO). The FA-FIFO queuing scheme implements the order-preserving flow logic described herein. In this way, a mixture of order-preserving and non-order-preserving classes can coexist and implement unified QoS policies with a single FA-CBQ scheduler.

In FIG. 1C, when a new packet is received at the scheduling mechanism, the appropriate flow queue for storing the packet may be determined by first assembling a flow key. In some implementations, the flow key may comprise TCP source and destination ports and IP source and destination addresses from the packet header.

The flow key may then be applied to a look-up table, hash table or other structure (represented as flow table 166) to identify a memory location of, or reference (e.g., a pointer) to, the corresponding flow queue. Illustratively, a flow queue may be identified by an address of a head (or tail) of the queue.

For each new packet received for scheduling, the location of its flow's corresponding flow queue is determined, and the packet is added at the tail of the queue. When a flow is terminated, its flow queue is torn down or reused for a different flow.

FIG. 1C thus depicts a set of network packets arriving at link scheduler 160 of a network device, for processing by one of four class modules 170a through 170d. In the illustrated implementation, classes 170a, 170b are order-preserving classes and are thus managed with flow queues 172, whereas classes 170c, 170d are non-order-preserving classes and are instead managed with any conventional queuing discipline, as in the original CBQ model. Although not shown in FIG. 1C, each order-preserving class comprises a class queue in which to queue flow queues 172.

By way of example, class 170a could represent an ICA low-priority class, class 170b could represent an ICA high-priority class, class 170c could represent other business-critical traffic and class 170d could represent other best-effort traffic.

Thus, a packet delivered to a non-order-preserving class (e.g., 170c, 170d) is processed according to a conventional queuing discipline.

On the other hand, a packet delivered to an order-preserving class (e.g., 170a, 170b) is processed according to the flow aware techniques described herein. In this case, flow table 166 is consulted to determine whether the packet belongs to a flow that is already queued in the system.

If such a flow queue 172 exists, the flow table returns the corresponding flow queue to the class module, and the packet is enqueued on the pre-existing flow queue. However, if no such queue exists, then a new empty flow queue 172 is created, the packet is added to the new flow queue, the queue is inserted into the class queue associated with the class module 170, and scheduler 180 is notified, if necessary, that the class has data ready.

To schedule packets for transmission on an outbound link, class-based scheduler 180 implements any number of known class-based scheduling algorithms utilizing class parameters that are configured into the class modules and/or the scheduler. The parameters ultimately control how service is delivered to the various classes and may include parameters like minimum bandwidth, maximum bandwidth, service curves, delay priorities, and so forth.

When the scheduler services a packet from a non-order-preserving class, it is handled as in traditional CBQ. But, when the scheduler services a packet from an order-preserving class, the class module selects a flow queue to be serviced from the class queue (using techniques described below), dequeues a packet from the flow, and returns that packet to the scheduler.

As it does so, it inspects the packet that is now at the head of the flow queue. If there is no such packet, then the flow queue is empty and it is removed from the flow table. If there is a packet and the class of that packet is different from that of the class module, then the flow queue is removed from the class module's class queue and is queued on the class queue that corresponds to the new class. If the class is the same, then the flow queue is re-queued at the end of the active class queue thereby implementing a round-robin policy among flows within a given class.

Thus, in flow-aware class-based scheduling techniques described herein, each flow queue corresponds to one communication flow, and stores an ordered sequence of the flow's packets that await scheduling. A flow's packets are posted to the corresponding flow queue in order, and are also scheduled in order, thereby avoiding the out-of-order problem that would otherwise be associated with traditional scheduling of a heterogeneous communication flow.

Although class queues are depicted as FIFO structures in some embodiments of the invention, in some alternative embodiments of the invention they may embody other scheduling or servicing schemes. For example, flow queues may be serviced out of order within a class queue, based on some property or characteristic of a particular communication flow. In some embodiments, one or more class queues in a FA-CBQ scheduler implement weighted fair queuing in which the flow queues within each class queue represents the traditional flows upon which the traditional fair queuing algorithm is operating.

One interpretation of the FA-CBQ scheduling scheme is that each flow queue dynamically and automatically migrates between class queues depending on the classification of the packet at the head of the flow queue. Specifically, as (or after) the packet at the head of the flow queue is scheduled, the entire flow queue migrates to the class queue associated with the subsequent packet's classification. Thus, a class queue may be thought of as a "queue of queues."

Figure 2A:
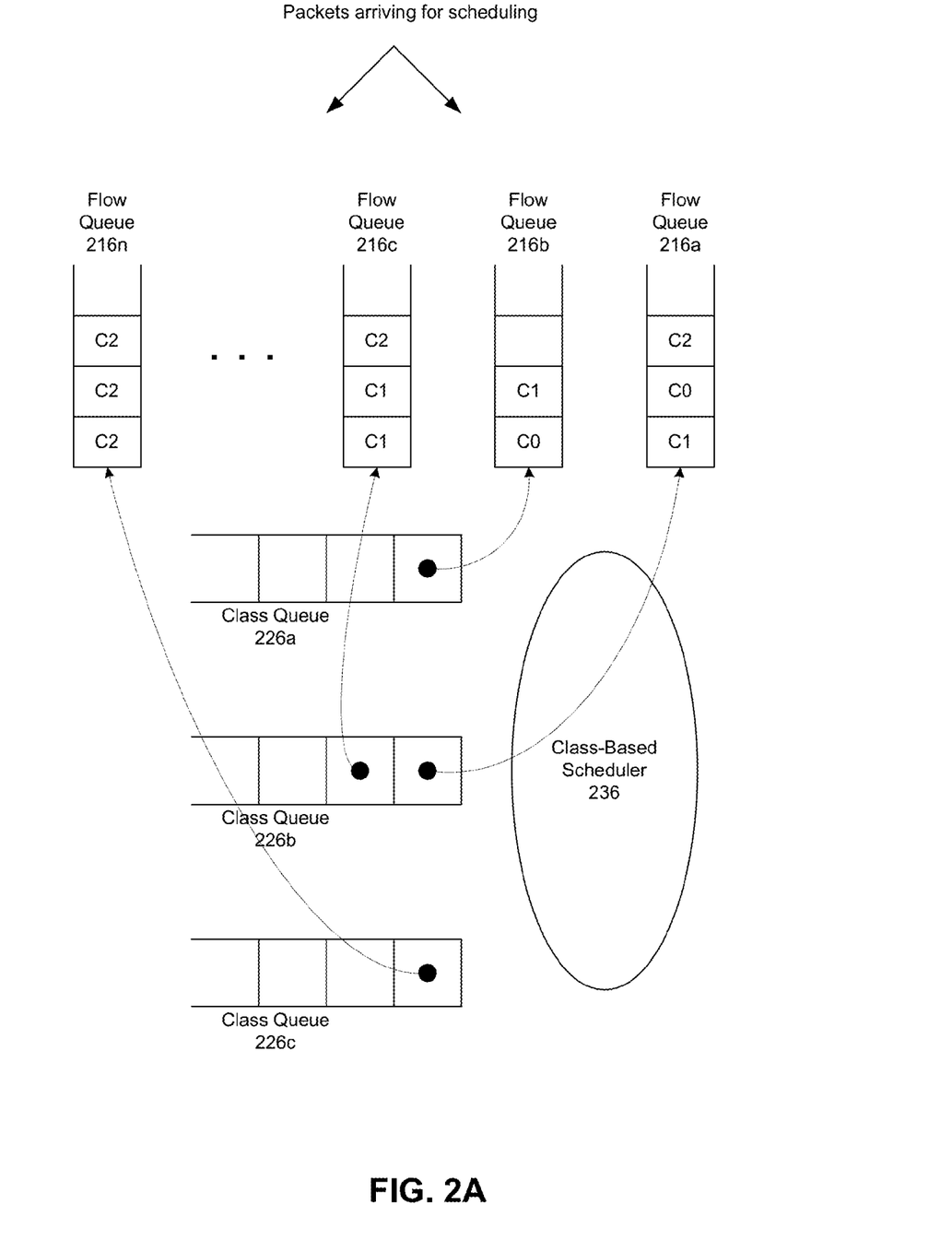
FIGS. 2A-2C are diagrams demonstrating dynamic migration of flow queues between class queues, according to some embodiments of the invention.
Figure 2B:
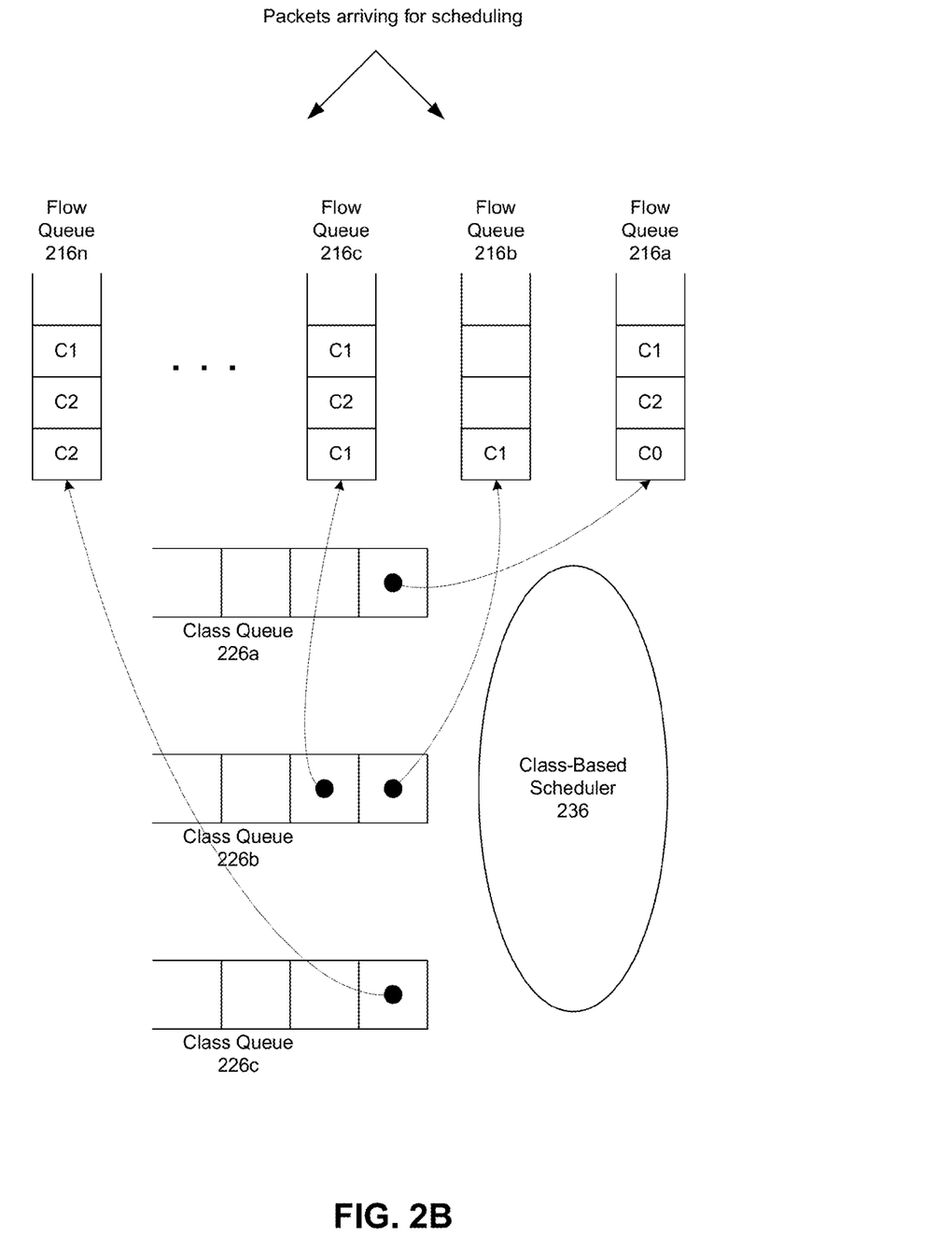
Figure 2C:
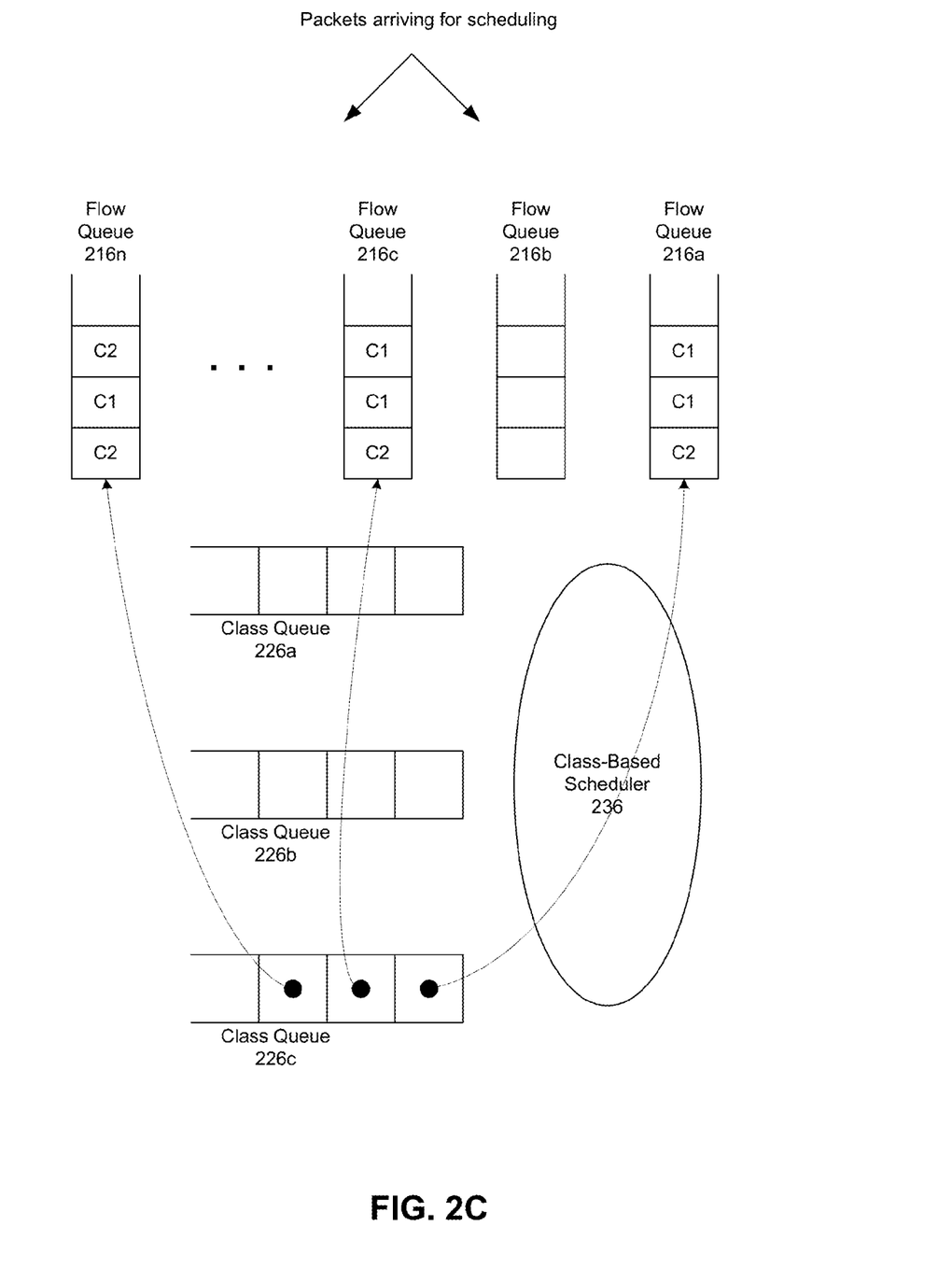

FIGS. 2A-2C demonstrate a specific example of how flow queues dynamically migrate between class queues based on the classifications of the packets at the heads of the flow queues, according to some embodiments of the invention.

In these embodiments, a scheduling mechanism of a computing device, a router, or other communication device that transmits packetized data communications includes class-based scheduler 236, which services class queues 226a, 226b and 226c. Individual communications (e.g., packets) are labeled to identify their classification. Thus, packets represented as C0 belong to class 0, packets C1 belong to class 1 and packets C2 belong to class 2.

For clarity, only one scheduler and three class queues are illustrated in FIGS. 2A-2C. In a communication device configured to implement an embodiment of the invention, any number of class queues may be employed. In addition, a device may include multiple instances of a class-based scheduler, each with its own configuration and classification rules (e.g., to manage different network links or to manage multiple virtual links within a single device). A virtual link might be, for example, a GRE (Generic Routing Encapsulation) tunnel from one device to another device in the network, wherein the administrator manages the tunnel with a QoS policy specific to that tunnel.

As packets are received for scheduling, they are placed in flow queues 216a-216n. Each flow queue corresponds to a single communication flow. Although all illustrated flow queues correspond to heterogeneous flows in FIGS. 2A-2C, in other embodiments some flows may be homogeneous.

FIG. 2A reflects a point in the scheduling process at which all three class queues 226 are active. Specifically, flow queue 216b is queued in class queue 226a, flow queues 216c and 216a are queued in class queue 226b, and flow queue 216n is queued in class queue 226c. It can be seen that for each flow queue within a class queue, the classification of the packet at the head of the flow queue matches the class of the scheduler.

While the scheduler is scheduling a packet, or immediately thereafter, the subsequent packet in the flow queue at the head of the class queue is examined to identify its classification. After the head packet is scheduled (and removed from the flow queue), the flow queue is dequeued from the class queue and enqueued in the corresponding class queue, which may be the same or a different queue. In some embodiments of the invention, two or more consecutive packets having the same classification may be scheduled before the flow queue is migrated.

Examination of the subsequent packet and migration of the flow queue may be performed by a separate controller entity, or these operations may be performed by the class-based scheduler itself (or some component of the scheduler).

FIGS. 2B and 2C reflect later points in time in the scheduling process. In particular, they reflect times after the head packets in each flow queue depicted in FIG. 2A have been scheduled and the flow queues have migrated. Thus, these figures are not meant to reflect successive or adjacent points in time, but are configured to more clearly illustrate how flow queues migrate between class queues according to the classification of the packets at the head of the flow queues.

In FIG. 2B, one packet (i.e., the head packet) of each flow queue 216 has been scheduled, and the flow queues have migrated to the class queues 226 that correspond to the packets that are now at the heads of the flow queues. In particular, flow queue 216a is now queued in class queue 226a, flow queues 216b and 216c are queued in class queue 226b, and flow queue 216n is queued in class queue 226c.

Again, the head packet in each flow queue is scheduled and removed from its queue, and FIG. 2C reflects an updated scheduling status after the packets previously at the heads of flow queues 216 have been scheduled and the flow queues have again migrated. Now, packets at the head of all three active flow queues 216a, 216c and 216n are classified as class 2, and so all three flow queues are queued in class queue 226c.

Of note, flow queue 216n was requeued at the tail of class queue 226c, even though the packet previously at the head of the flow queue belonged to the same class. As already described, in some other embodiments of the invention, a flow queue may remain at the head of a class queue while more than one packet is scheduled with the same class of service.

It may also be noted that flow queue 216b is empty in FIG. 2C. The flow may have been terminated, in which case the flow queue may be torn down, or another packet in the flow may not yet have been received.

In some alternative embodiments of the invention, packets need not be removed or dequeued from their flow queues after they are serviced. A head pointer, or other reference, may simply advance within a flow queue structure to identify the packet currently at the head of the queue.

Figure 3:
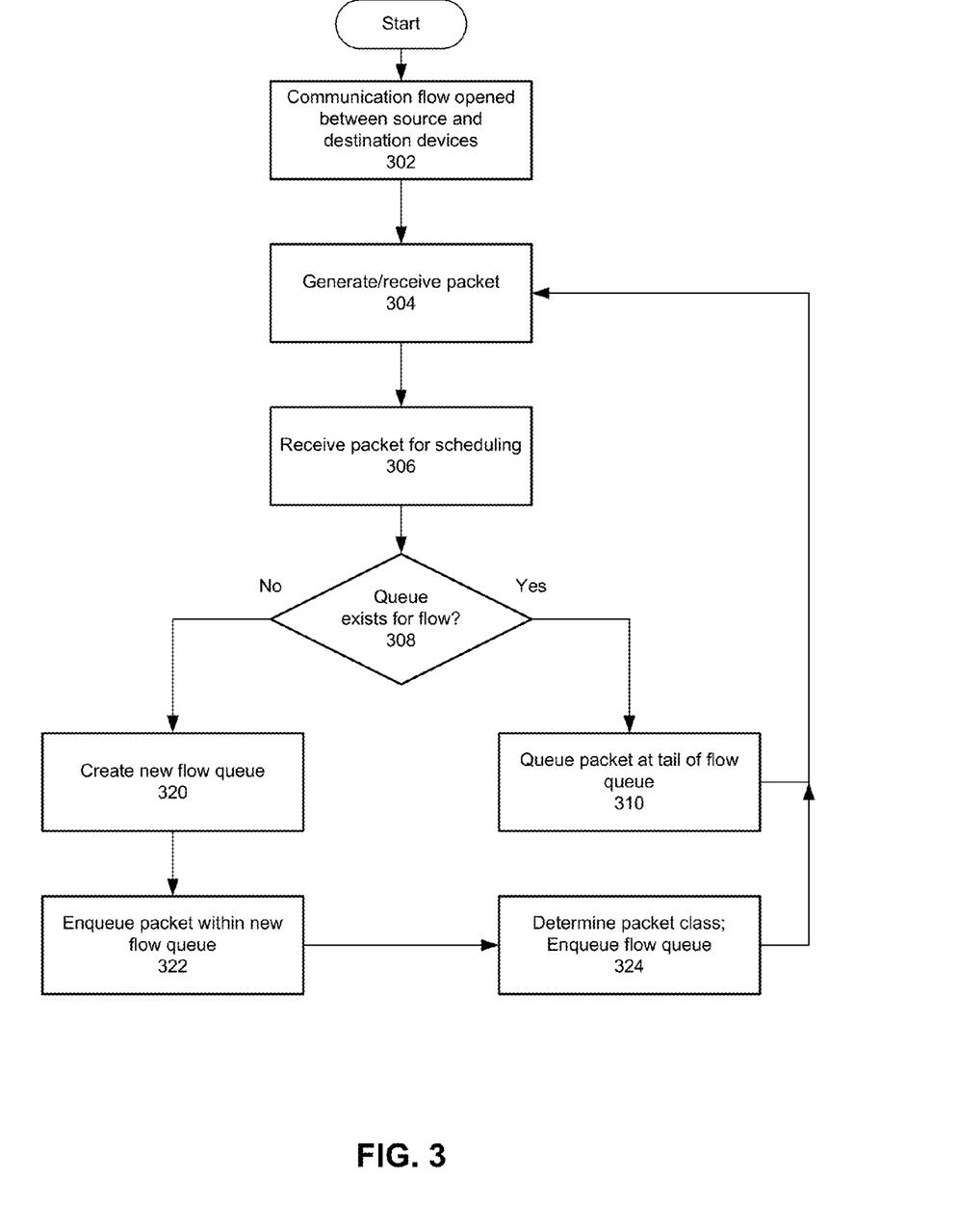
FIG. 3 is a flowchart demonstrating a method of queuing packets of a heterogeneous communication flow for scheduling, according to some embodiments of the invention.

FIG. 3 is a flowchart demonstrating a method of queuing packets of a heterogeneous communication flow for scheduling, according to some embodiments of the invention.

In operation 302, a heterogeneous communication flow is opened between two devices. The flow may be of a client/server nature, may represent a peer-to-peer relationship, or some other communication arrangement. Some embodiments of the invention may be implemented within an intermediate network device, such as a router, a switch, a transaction accelerator, a proxy server, a caching server, etc.

In operation 304, a packet is generated or received within one of the devices as part of the communication flow. The packet may be initiated by any of multiple processes or other executable computer program components participating in the communication flow, and may relate to a data request, a response, a file transfer, an input action (e.g., a mouse movement or key press), etc. Pass-through traffic may also be present.

In operation 306, the packet is received at a scheduling mechanism, such as link scheduler 160 of FIG. 1C. The scheduling mechanism may be configured to schedule among any number of communication flows simultaneously, which may include homogeneous communication flows as well as heterogeneous flows.

In operation 308, the scheduling mechanism determines whether a flow queue already exists for the communication flow. To identify the correct flow queue, a flow key may be generated from contents of the packet's header (e.g., source and destination TCP ports, source and destination IP addresses), and then used to search a flow table that identifies where the flow queue is located in memory (if it exists).

If the flow's queue already exists, the method continues at operation 310; otherwise, the method advances to operation 320.

In operation 310, the new packet is enqueued at the tail of the flow's flow queue. As subsequent packets are received, they will continue to be enqueued at the tail to maintain correct ordering of the flow's packets. As mentioned above, packets' classifications are available to the scheduling mechanism through the queuing and scheduling process. After operation 310, the illustrated method returns to operation 304 to handle the next packet.

In operation 320, a new flow queue is established in memory for the communication flow, and the flow table (e.g., a lookup table, a hash table) is updated to point to or reference the flow queue.

In operation 322, the packet is enqueued in the new flow queue.

In operation 324, the classification of the new packet is determined and the new flow queue is enqueued within the corresponding class queue. As described above, a class module maintains a class queue for queuing flow queues and/or individual packets.

To queue the flow queue, an entry that points to or otherwise references the flow queue is queued at the tail of the appropriate class queue. In some alternative embodiments of the invention, the entry may be inserted mid-queue or at the head of the queue (e.g., based on some characteristic of the corresponding flow).

After operation 324, the method returns to operation 304 to handle the next packet. Operations 304-324 may be repeated any number of times to continue queuing packets for scheduling, even as previous packets are scheduled and transmitted.

Figure 4:
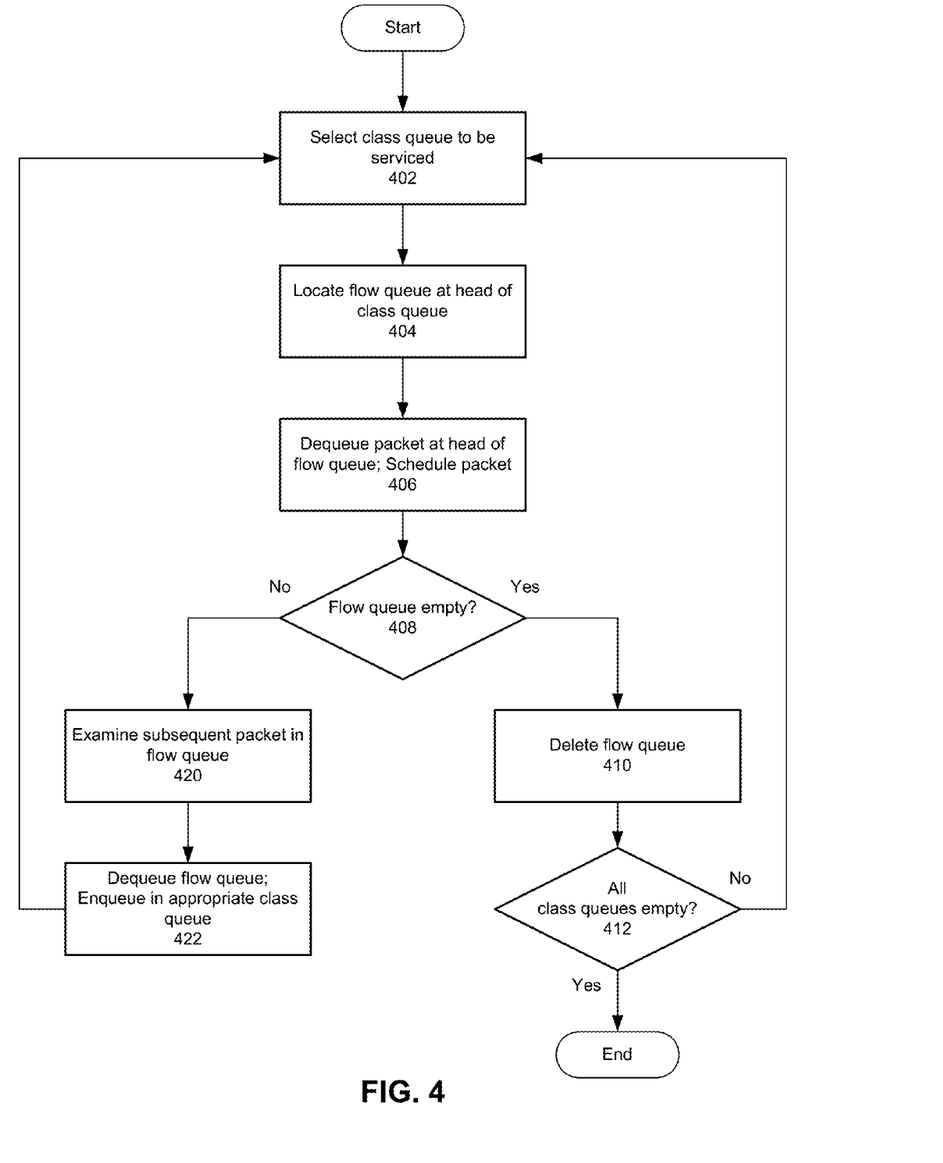
FIG. 4 is a flowchart demonstrating a method of scheduling packets of a heterogeneous communication flow, according to some embodiments of the invention.

FIG. 4 is a flowchart demonstrating a method of scheduling packets of a heterogeneous communication flow, according to some embodiments of the invention. The methods of FIGS. 3 and 4 may operate in parallel.

In operation 402, a class queue that has at least one queued flow queue is selected for servicing. Illustratively, class queues may be serviced based on their class or level of service, a priority associated with the queues, a particular scheduling or queuing algorithm (e.g., SFQ or Stochastic Fairness Queuing, round-robin), etc.

In operation 404, within the selected class queue, the flow queue at the head of the class queue is identified or selected for servicing. In some alternative embodiments of the invention, flow queues may be serviced in some order other than FIFO.

In operation 406, the packet at the head of the selected flow queue, which is certain to have the same classification as the class queue, is scheduled for transmission. More specifically, the packet is dequeued from the flow queue and scheduled.

In operation 408, the scheduler determines whether the flow queue that was just serviced is empty. If so, the method continues at operation 410; otherwise, the method advances to operation 420.

In operation 410, the empty flow queue is deleted and thereby automatically deleted from the class queue in which it was queued.

In operation 412, it is determined whether all class queues are empty. If so, the method may end; otherwise, the method returns to operation 402 to continue the scheduling process.

In operation 420, the next packet in the flow queue (i.e., the new head packet), if one exists, is examined to identify its class of service. If there is no other packet in the queue.

In operation 422, the flow queue is dequeued from the current class queue and requeued in the class queue corresponding to the classification of the new head packet, which may be the same or a different class queue. If it is the same queue, and there are no other entries (flow queues) in the class queue, this operation may be omitted.

In some embodiments of the invention, the flow queue may remain in its current position within the class queue, if the new head packet's classification matches the class queue's class of service, even if it is not the only entry in the class queue. For example, multiple sequential packets at one class of service may be permitted to be scheduled in succession from a flow queue once it is at the head of the class queue.

In the event of congestion or delay in a scheduling mechanism operating according to an embodiment of the invention, packets may be dropped from flow queues in accordance with a RED, drop-tail or other drop policy. In some embodiments, a flow that is busier than other flows may be more likely to have a packet dropped than the other flows.

In some circumstances, such as when a class queue contains a large number of flow queues, one or more packets may be dropped from one or more flow queues to ensure there is memory space to add another flow queue to the class queue and thereby avoid starving that queue.

Figure 5:
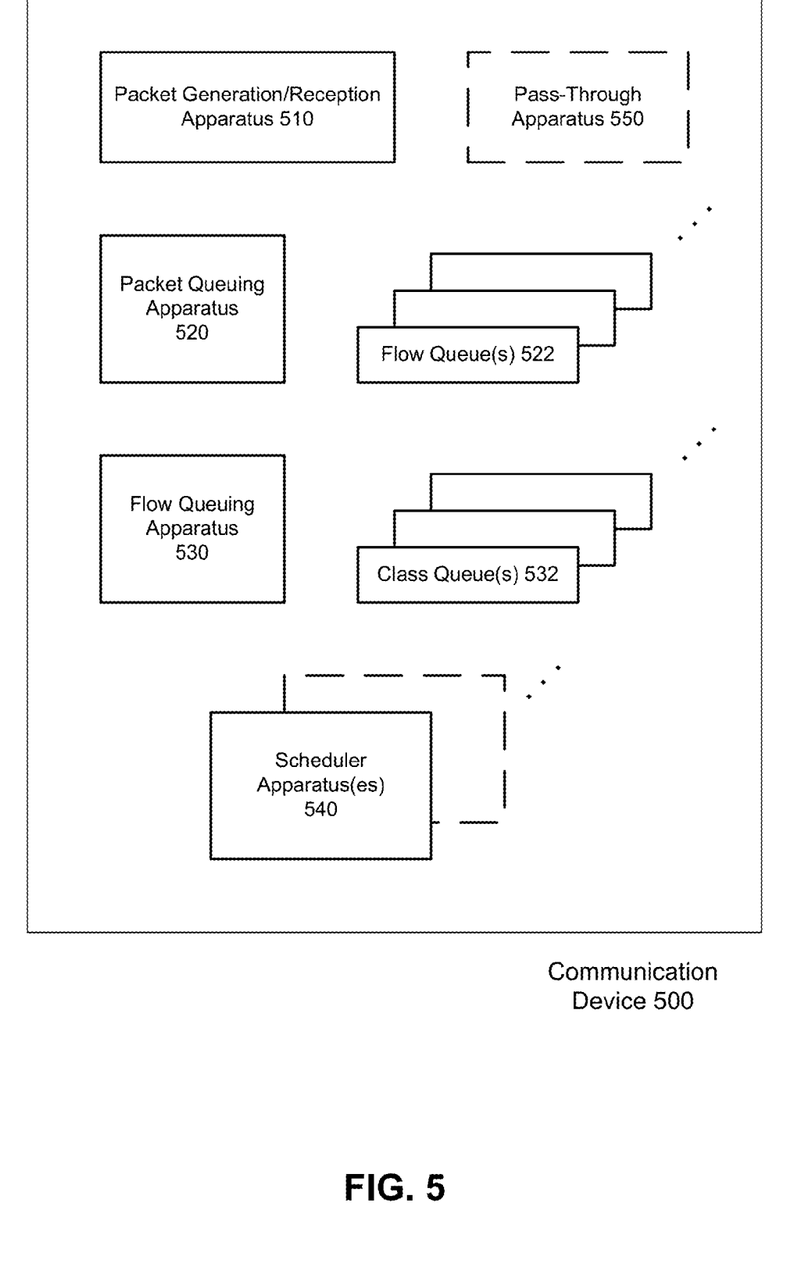
FIG. 5 is a block diagram of apparatus for scheduling a heterogeneous communication flow, according to some embodiments of the invention.

FIG. 5 is a block diagram of hardware apparatus for scheduling packets of a heterogeneous communication flow, by migrating flow queues of packets among class queues associated with different packet classifications, according to some embodiments of the invention.

Communication device 500 of FIG. 5 comprises packet generation/reception apparatus 510, packet queuing apparatus 520, flow queues 522, flow queuing apparatus 530, class queues 532, one or more scheduler apparatuses 540 and optional pass-through apparatus 550. Any or all of these apparatuses may be combined in other embodiments of the invention. For example, packet queuing apparatus 520 and flow queuing apparatus 530 may be merged, or may even be implemented as part of scheduler apparatus(es) 540.

Packet generation/reception apparatus 510 is adapted to generate or receive packets having varying classes of service, which may correspond to different priorities or other quality of service parameters. Illustratively, apparatus 510 may comprise a processor or processors for executing software processes or firmware modules configured to produce or receive data communications to be scheduled for transmission at the various classes of service.

Packet queuing apparatus 520 is adapted to queue packets produced or received by packet generation apparatus 510 into flow queues 522. Any number of flow queues may be maintained, and may be identified by flow keys that comprise any suitable data for distinguishing flows (e.g., addresses of a flow's source and destination). Apparatus 520 is specifically configured to maintain ordering of packets within a flow queue 522, to avoid having the packets processed out of order.

Flow queuing apparatus 530 is adapted to queue flow queues 522 within class queues 532. Illustratively, an entry in a class queue 532 may comprise a pointer or other reference to a particular flow queue, wherein the packet at the head of that flow queue has a classification corresponding to that of the class queue.

Scheduler apparatus(es) 540 are adapted to schedule packets for transmission, in the order in which they were queued in their flow queues. In some embodiments, a separate scheduler apparatus may service each class queue 532, or multiple class queues may be serviced by a single scheduler apparatus.

Pass-through apparatus 550 is adapted to shuttle pass-through packets through communication device 500. Pass-through traffic may or may not be processed through according to its indicated quality or level of service.

Figure 6:
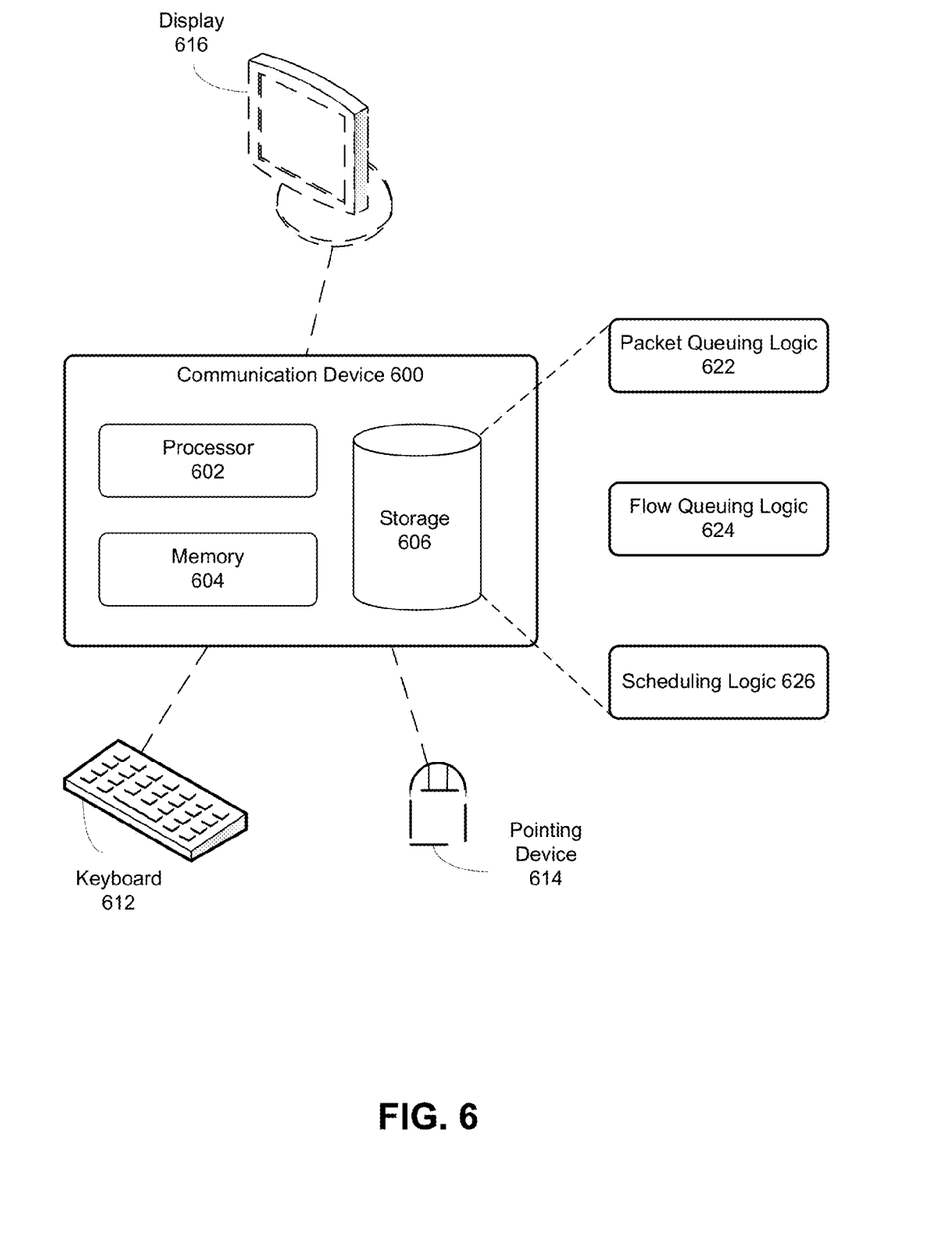
FIG. 6 is a block diagram of a network device configured to schedule a heterogeneous communication flow, according to some embodiments of the invention.

FIG. 6 is a block diagram of a communication device that may be configured to schedule packets of a heterogeneous communication flow, according to some embodiments of the invention.

Communication device 600 of FIG. 6 comprises processor 602, memory 604 and storage 606, which may comprise one or more optical and/or magnetic storage components. Communication device 600 may be coupled (permanently or transiently) to keyboard 612, pointing device 614 and display 616.

Storage 606 of the communication device stores logic that may be loaded into memory 604 for execution by processor 602. Such logic includes packet queuing logic 622, flow queuing logic 624 and scheduling logic 626.

Packet queuing logic 622 comprises processor-executable instructions for queuing packets of multiple communication flows into separate flow queues corresponding to individual flows. Each flow's packets are placed into its flow queue in the order in which the packets are generated and/or received for scheduling. Logic 622 may operate continuously, as long as at least one communication flow is active.

Flow queuing logic 624 comprises processor-executable instructions for queuing flow queues for service within class queues attended by one or more schedulers. Specifically, each flow queue (or a reference to a flow queue) is queued in a class queue having an associated classification that matches the class of service of the packet at the head of the flow queue.

Scheduling logic 626 comprises processor-executable instructions for scheduling packets for transmission from communication device 600. Scheduling logic 626 may employ any suitable algorithm for servicing the class queues and flow queues, such as CBQ, HFSC, HPFQ, HTB, CB-WFQ, round-robin, FIFO, etc.

Flow queuing logic 624 may operate cooperatively with, but independent of, scheduling logic 626. For example, each time logic 626 schedules a packet from a flow queue, logic 624 may be used to identify the classification of the subsequent packet in that flow queue, dequeue it from its current class queue, and requeue the flow queue in a corresponding class queue.

However, in some embodiments of the invention, scheduling logic 626 includes one or both of flow queuing logic 624 and packet queuing logic 622.

Data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of servicing packets according to a class-based scheduler, the method comprising:
dequeuing a flow queue from a first class queue corresponding to a first class of service of a first packet of the flow queue, wherein the flow queue comprises multiple packets having multiple classes of service;
dequeuing the first packet from the flow queue;
servicing the first packet;
classifying a second packet at a head of the flow queue to identify a second class of service; and
enqueuing the flow queue in a second class queue corresponding to the second class of service, based solely on the second class of service;
wherein:
the second class of service of the second packet matches the first class of service of the first packet;
the second class queue comprises the first class queue; and
said enqueuinq the flow queue within a second class queue comprises re-queuing the flow queue within the first class queue.

2. The method of claim 1, wherein:
the flow queue comprises references to packets.

3. The method of claim 2, wherein:
each of the first class queue and the second class queue is configured to comprise references to flow queues.

4. The method of claim 1, further comprising:
receiving a new packet; and
enqueuing the new packet within the flow queue.

5. The method of claim 1, further comprising:
storing a storage location of the flow queue.

6. The method of claim 5, wherein:
said enqueuing a flow queue within a first class queue comprises writing to an electronic storage area associated with the first class queue a reference to the storage location of the flow queue.

7. A method of migrating a heterogeneous flow of data among multiple class queues, the method comprising:
enqueuing a flow queue within a first class queue associated with a first class of service assigned to a first packet in the flow queue, wherein the flow queue comprises multiple packets having multiple classes of service;
dequeuinq the first packet from the flow queue; and
after the first packet is scheduled, enqueuing the flow queue within a second class queue associated with a class of service assigned to a second packet in the flow queue, without regard to classes of service assigned to other packets in the flow queue;
wherein:
the second class of service of the second packet matches the first class of service of the first packet;
the second class queue comprises the first class queue; and
said enqueuinq the flow queue within a second class queue comprises re-queuing the flow queue within the first class queue.

8. The method of claim 7, wherein:
the flow queue comprises multiple packets having multiple different classes of service; and
the first class queue comprises multiple other flow queues also comprising multiple packets having multiple different classes of service.

9. A non-transitory computer-readable medium storing instructions that, when executed by a computer, cause the computer to perform a method of servicing packets according to a class-based scheduler, the method comprising:
dequeuing a flow queue from a first class queue corresponding to a first class of service of a first packet of the flow queue, wherein the flow queue comprises multiple packets having multiple classes of service;
dequeuing the first packet from the flow queue;
servicing the first packet;
classifying a second packet at a head of the flow queue to identify a second class of service; and
enqueuing the flow queue in a second class queue corresponding to the second class of service, based solely on the second class of service;
wherein:
the second class of service of the second packet matches the first class of service of the first packet;
the second class queue comprises the first class queue; and
said enqueuinq the flow queue within a second class queue comprises re-queuing the flow queue within the first class queue.

10. The computer-readable medium storing instructions of claim 9, wherein:
the flow queue comprises references to packets.

11. The computer-readable medium storing instructions of claim 10, wherein:
each of the first class queue and the second class queue is configured to comprise references to flow queues.

12. The computer-readable medium storing instructions of claim 9, wherein the method further comprises:
receiving a new packet; and
enqueuing the new packet within the flow queue.

13. The computer-readable medium storing instructions of claim 9, wherein the method further comprises:
storing a storage location of the flow queue.

\* \* \* \* \*